United States Patent

[11] 3,615,561

| [72] | Inventors | Thomas J. Dolce<br>Scotch Plains;<br>Donald L. McCabe, Rahway, both of N.J. |
|---|---|---|
| [21] | Appl. No. | 35,288 |
| [22] | Filed | May 6, 1970 |
| [23] | | Division of Ser. No. 637,348,<br>May 10, 1967, Pat. No. 3,539,476 |
| [45] | Patented | Oct. 26, 1971 |
| [73] | Assignee | Celanese Corporation<br>New York, N.Y. |

[54] AQUEOUS COATING COMPOSITIONS FOR ADHERING LIGHT-SENSITIVE EMULSION TO POLYESTER FILM
5 Claims, No Drawings

[52] U.S. Cl. ........................................ 96/87 R,
117/34, 117/138.8 F, 117/161 UT
[51] Int. Cl. ........................................ G03c 1/80
[50] Field of Search ........................................ 96/87;
117/34, 138.8 F, 161 UT

[56] References Cited
UNITED STATES PATENTS

| 2,397,866 | 4/1946 | McQueen | 96/84 |
|---|---|---|---|
| 2,627,088 | 2/1953 | Alles et al. | 264/134 |
| 2,779,684 | 1/1957 | Alles | 117/7 |
| 2,943,937 | 7/1960 | Nadeau et al. | 96/87 |
| 2,976,168 | 3/1961 | Thompson et al. | 117/34 |
| 3,081,198 | 3/1963 | Miller | 117/155 |
| 3,143,421 | 8/1964 | Nadeau et al. | 96/87 |
| 3,443,950 | 5/1969 | Rawlins | 96/87 |

*Primary Examiner*—Ronald H. Smith
*Attorneys*—Thomas J. Morgan, Linn I. Grim and Richard A. Lucey

ABSTRACT: An aqueous coating composition for adhering various types of layers to polyester sheet or film surfaces, the aqueous coating composition comprising a vinylidene chloride terpolymer, gelatin, and a copolymer of ethylene and vinyl acetate.

AQUEOUS COATING COMPOSITIONS FOR ADHERING LIGHT-SENSITIVE EMULSION TO POLYESTER FILM

BACKGROUND OF THE INVENTION

This invention is a divisional application of U.S. Pat. application, Ser. No. 637,348, filed on May 10, 1967, now Pat. No. 3,539,476.

The present invention relates to an improved aqueous coating composition for polyester sheet or film. More particularly, the present invention relates to polyester sheet or film having a resinous coating on at least one surface thereof, and still more particularly to a polyester film base wherein the resinous coating functions as an improved anchoring substratum or subbing layer between the film base and a light-sensitive, water-permeable colloid layer or emulsion disposed thereon.

It is known that high molecular weight linear polyesters can be formed into sheets having many desirable physical properties which make them attractive for use as photographic film bases. This is particularly true for highly polymeric ethylene glycol-terephthalic acid polyesters. However, polyesters of this class are very hydrophobic, and in order to secure adhesion to them of a normal type of hydrophilic, light-sensitive emulsion layer, it is necessary to provide one or more intermediate anchoring layers, so-called subbing or substratum layers. While various compositions and combinations of layers have been proposed and used for this purpose, such as a composition comprising a terpolymer of vinylidene chloride, none have proven entirely satisfactory in actual commercial practice. For example, the use of synthetic polymer subbing compositions usually requires a second subbing thereover of a gelatin composition prior to the application of the light-sensitive emulsion layer. But even with the double subbing technique, the final photographic film elements usually show some skidding and spontaneous stripping of the emulsion layer after processing and drying operations.

In addition, the surface of the subbing layer or layers used heretofore has been rough, thereby detrimentally affecting the ultimate photographic quality of the film element.

SUMMARY OF THE INVENTION

Accordingly, the primary object of the present invention is to provide an improved coating composition for adhering a light-sensitive emulsion layer to a polyester film base. Other objects will appear hereinafter.

In accordance with the present invention there is provided an aqueous coating composition comprising a. from about 5 to about 40 weight percent of a vinylidene chloride terpolymer, b. from about 2 to about 35 weight percent of a copolymer of ethylene and vinyl acetate, and c. from about 0.5 to about 15 weight percent of gelatin.

The aqueous coating composition has a maximum solids content of about 65 weight percent.

Preferably, the coating composition consists essentially of a. from about 24 to about 32 weight percent of the terpolymer, b. from about 6 to about 14 weight percent of the ethylene copolymer, c. from about 1 to about 5 weight percent of gelatin, and d. the remainder water and additives conventionally used by those skilled in the art such as dispersants, antifoams and the like.

DESCRIPTION OF THE PREFERRED EMBODIMENT

It has been found that the above three component subbing layer adheres firmly to polyester sheet or film base. In addition, when the three component layer is over coated with a gelatin layer and/or a light-sensitive emulsion layer, the film element thus obtained retains all of the desirable physical properties of the polyester film base with none of the above-mentioned disadvantages of emulsion skidding and stripping which occurs with related prior art photographic elements. Moreover, the three component subbing layer results in a smooth surface such that the photographic quality of the final film element is not detrimentally affected.

The vinylidene chloride terpolymer which is used in the present invention is the well known terpolymer of vinylidene chloride, an acrylic ester, preferably acrylonitrile, and itaconic acid, the initial relative proportions of the monomers in the polymerization reaction mixture being within the following ranges:

| Monomer | Range Percent | Preferred Range Percent |
|---|---|---|
| Vinylidene chloride | 35.0 to 96 | 75 to 95 |
| Acrylic ester | 3.5 to 64.5 | 4 to 20 |
| Itaconic acid | 0.5 to 25 | 1 to 5 |

The useful acrylic esters which are normally employed in the production of the terpolymer are the alkyl esters of acrylic and methacrylic acids, the alkyl group having from one to 18 carbon atoms, e.g., methyl methacrylate, ethyl methacrylate, butyl methacrylate, octamethacrylate, n-dodecyl methacrylate, n-octadecyl methacrylate, methylacrylate, ethylacrylate and propylacrylate. The term acrylic esters is also meant to include vinyl chloride, acylonitrile and methacrylonitrile.

The above monomers may be copolymerized to yield the terpolymer by any of the methods well known to those skilled in the art, for example, as set forth in Alles et al. U.S. Pat. No. 2,627,088.

The ethylene-vinyl acetate copolymers useful in the present invention are thermoplastic solids containing about 1 to 30 percent combined ethylene and correspondingly about 70 to 99 percent of combined vinyl acetate. Copolymers containing about 5 to 2 percent ethylene and about 80 to 95 percent vinyl acetate are particularly desirable.

Preferably, the ethylene-vinyl acetate copolymer is prepared and used in the form of an aqueous emulsion. Suitable copolymers of this type have recently been introduced commercially under the "Aircoflex 100" brand of Air Reduction Corporation, and have the following typical properties.

| | "Aircoflex 100" |
|---|---|
| Torsion modulus at 25° C.* Gehman Flexibility Tester | 1,000 p.s.i. |
| Softness at 25° C.* Penetrometer | 3.3 mm. |
| Calendered gloss**, as percentage of 75° reflectance | 67% |
| Ultimate Tensile Strength*** | 650 p.s.i. |
| Ultimate Elongation*** | 1,150% |
| Weight-average molecular weight | Greater than one million |

\* 100% resin
\*\*Determined on clay coatings containing 20 parts binder solids for each 100 parts clay.
\*\*\*Values obtained on an Instron tester at 72° F. and 50% R.H., and at a crosshead speed of 20 inches per minute.

The vinylidene chloride terpolymer, ethylene-vinyl acetate copolymer, and gelatin may be mixed with water in any convenient fashion, either continuously or batchwise, to prepare the aqueous coating composition within the aforesaid ranges. As previously mentioned, the copolymer is usually added as an aqueous emulsion. The resulting aqueous coating composition has a solids content of from about 5 to about 65 weight percent, and preferably in the range of from about 20 to about 60 weight percent, the weight percent being based on the total weight of the aqueous composition. While solids percentages lower than 5 percent or higher than 65 percent might be used, such compositions would not normally be economically attractive from a commercial standpoint. The solids content of the coating composition is based on the amount of terpolymer, copolymer, and gelatin contained therein. Normally, the three components of the coating composition are mixed in a conventional stirred vessel at room temperature and atmospheric pressure. However, lower or higher temperatures and pressures may be used, although they are not necessary. The coating composition may be filtered, if so desired, in order to enhance the consistency of the resulting composition.

The aqueous coating composition may be deposited on one or more sides of the polyester support or film base by any of the conventional methods used in the manufacture of photographic elements, e.g., by immersion of the surfaces of the film into a solution of the coating material, spraying, beading, or coating from a hopper provided with a doctor blade, etc. Preferably, both sides of the polyester film or sheet are coated. In this manner, one side may then be overcoated with a photographic emulsion, and to eliminate any tendency to curl, the other side overcoated with a gelatin composition containing no light-sensitive components, but which may contain, if desired, antistatic agents, filter dyes, antihalation agents, and the like. The aqueous coating composition may be applied to the polyester support or film base either before or after it has been stretched or oriented, for example, as set forth in Alles et al. U.S. Pat. No. 2,627,088.

If desired, more than one layer of the coating composition may be applied. The thickness of the resulting coating of the three component composition of the present invention, whether applied as one or more layers, may vary over a fairly wide range, e.g., 0.05 mil to 1.0 mil or more. In general, however, coatings of from 0.1 to 0.2 mil will be most useful.

The resulting coated support or film base is dried for a period of time in the range of from about 5 seconds to about 10 minutes, and preferably from about 30 seconds to about 2 ½ minutes at a temperature in the range of from about 75° to about 200° C., and preferably from about 100° to about 150° C.

After the three component subbing layer has dried, a gelatin layer and/or any of the well known light-sensitive emulsion layers may be coated thereover and dried.

Any of the light-sensitive materials used by those skilled in the art may be coated onto the three component anchoring or subbing layer. In addition to light-sensitive silver salts, such as silver chloride, silver bromide, silver chloride-bromide, silver chloride-iodide and similar mixtures, there may be utilized bichromated hydrophilic colloids, e.g., albumin, gelatin, gum arabic, polyvinyl alcohols, or glue. The light-sensitive layers, of course, are applied in the absence of actinic radiations. Immobile color formers, dye intermediates or dyes may be present in such layers. Other materials include light-sensitive iron salts and diazonium compounds with or without coupling components.

Suitable polyester sheet or film materials which may be used in the present invention may be composed of any polyester of a dicarboxylic acid and a dihydric alcohol of the type described in Carothers U.S. Pat. No. 2,071,250, or may be composed of any of the high-melting, usually microcrystalline, cold-drawing linear, highly polymerized esters of terephthalic acid and glycols of the series $HO(CH_2)_nOH$, where n is an integer within the range of 2 to 10, as described in whinfield et al. U.S. Pat. No. 2,465,319.

Moreover, the polyesters from which the film or support is made need not consist solely of glycol units since some of the glycols react to form polyglycols, and small percentages of units from such polyglycols may be present. For instance, when ethylene glycol is a reactant, the polyester may contain from 1 to 15 percent or more of units from diethylene glycol (i.e., $-CH_2CH_2OCH_2CH_2O-$units). Also when a mixture of glycols and polyglycol is used, e.g., ethylene glycol and diethylene glycol, the copolymers may contain a substantial proportion of oxyethylene units.

Preferably, the polyester sheet or film to which the aqueous coating composition is applied is crystallizable polyethylene terephthalate, and more preferably polyester which has been heat treated as set forth in Alles U.S. Pat. No. 2,779,684.

The polyester film may contain pigments or dyes to color it any desired color. When the film is to be used as photographic film base for X-ray film, it may be tinted green or blue. The three component subbing layer may be similarly tinted and may contain an antistatic material. Filled opaque polyester film or polyester films coated with carbon to make them opaque may also be used.

If desired the subbing or anchoring composition of the present invention may be used on bases made of paper and hydrophobic materials such as hydrophobic cellulose carboxylic acid ester, including cellulose acetate, cellulose acetate butyrate, cellulose nitrate; a superpolymer, for example, a superpolyamide (nylon), a polyvinyl chloride, and the like.

This invention is additionally illustrated by the following examples, wherein all percentages or parts are on a weight basis unless otherwise indicated:

EXAMPLE I

A vinylidene chloride-acrylonitrile-itaconic acid terpolymer was made by admixing the following constituents in a reaction vessel:

|  | Grams |
| --- | --- |
| Vinylidene chloride | 600.0 |
| Acrylonitrile | 52.7 |
| Itaconic acid | 6.6 |
| Water | 989.0 |
| Ammonium persulfate | 0.70 |
| Sodium metabisulfite | 0.35 |
| Sodium lauryl sulfate (Duponol ME) | 55.4 |

The reaction vessel was heated to about 34° C. and the contents stirred until all of the vinylidene chloride was consumed, which is indicated by cessation of reflux. The time required to consume the vinylidene chloride was about three hours. The resulting terpolymer emulsion was then cooled and filtered.

Fifteen hundred grams of the aqueous terpolymer emulsion was then mixed with 500 grams of a 10 percent by weight aqueous gelatin solution and the resulting mixture filtered.

Eighteen hundred grams of the terpolymer-gelatin composition was then mixed with 500grams of an ethylene-vinyl acetate copolymer emulsion (Aircoflex 100), having a 50 percent by weight solids content to yield an aqueous coating composition comprising:

|  | Wt. % |
| --- | --- |
| Terpolymer | 22.5 |
| Gelatin | 1.9 |
| Copolymer | 12.5 |
| Water | 63.1 |
|  | 100.0 |

The above composition was then coated onto a polyethylene terephthalate film and the coating dried at 100° C. for 2 minutes. After drying, three component subbing layer was subjected to the "Scotch Tape" test. The adhesion of the subbing layer to the polyester film was excellent as none of the subbing was removed or pulled away by the Scotch Tape. In addition, the surface of the subbing layer was quite smooth.

A gelatin solution (10 percent by weight gelatin) was applied as an overcoating to a polyester film having a subbing layer as described above. The gelatin overcoating was dried at 150° F. for 5 minutes. The adhesion of the gelatin layer was measured by the "Scotch Tape" test and found to be excellent.

When a light-sensitive emulsion layer is applied on top of the three component subbing layer, either with or without an intermediate gelatin layer, the light-sensitive emulsion layer is not removed by the "Scotch Tape" test. In addition, the final photographic film element does not show any skidding or spontaneous stripping after final processing and drying operations.

EXAMPLE II

Ninety parts of the vinylidene chloride terpolymer composition described in example I was mixed with 10 parts of an aqueous solution of gelatin (10 percent by weight gelatin). The resulting terpolymer-gelatin composition, containing 36 percent terpolymer and 1 percent gelatin, was then coated onto a polyethylene terephthalate film and the coated film dried at 100° C. for 2 minutes. The resulting gelatin terpolymer subbing layer surface was quite rough.

A gelatin layer was then added as an overcoat as in example I, dried, and the "Scotch Tape" test applied. The gelatin layer pulled away from the subbing layer.

EXAMPLE III

A vinylidene chloride terpolymer emulsion similar to that described in example I, containing 40 percent by weight solids, was coated on to a polyethylene terephthalate film and dried at 100° C. for 2 minutes. The resulting terpolymer subbing layer surface was quite rough. An aqueous gelatin solution was then applied as an overcoating as in example I. After drying, the adhesion of the gelatin layer was measured by the "Scotch Tape" test and was found to be very poor as it pulled away with the tape.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. In a method for adhering a light-sensitive emulsion layer to at least one surface of a polyester film, the improvement which comprises coating said polyester film surface with at least one subbing layer of an aqueous coating composition comprising
   a. from about 5 to about 40 weight percent of a terpolymer of vinylidene chloride, acrylic ester, and itaconic acid,
   b. from about 2 to about 35 weight percent of a copolymer of ethylene and vinyl acetate, and
   c. from about 0.5 to about 15 weight percent of gelatin, said aqueous coating composition having a solids content in the range of from about 5 to about 65 weight percent.

2. The method of claim 1, wherein the aqueous coating composition comprises from about 24 to about 32 weight percent of the terpolymer, from about 6 to about 14 weight percent of the ethylene copolymer, from about 1 to about 5 weight percent of gelatin, and the solids content of the aqueous coating composition is in the range of from about 20 to about 60 weight percent.

3. A polyester film which has been coated on at least one surface with an aqueous coating composition comprising
   a. from about 5 to about 40 weight percent of a terpolymer of vinylidene chloride, acrylic ester and itaconic acid,
   b. from about 2 to about 35 weight percent of a copolymer of ethylene and vinyl acetate, and
   c. from about 0.5 to about 15 weight percent of gelatin, the total solids content of the aqueous coating composition being in the range of from about 5 to about 65 weight percent.

4. The polyester film of claim 3, wherein the aqueous coating composition comprises from about 24 to about 32 weight percent of the terpolymer, from about 6 to about 14 weight percent of the ethylene copolymer, from about 1 to about 5 weight percent of gelatin, and the solids content of the aqueous coating composition is in the range of from about 20 to about 60 weight percent.

5. A photographic element comprising at least one silver halide emulsion layer superimposed upon a polyester film support which has been coated with an aqueous coating composition comprising in the range of from about 24 to about 32 weight percent of a terpolymer of vinylidene chloride, an acrylic ester and itaconic acid, from about 6 to about 14 weight percent of a copolymer of ethylene and vinyl acetate, from about 1 to about 5 weight percent of gelatin, and the solids content of the aqueous composition is in the range of from about 20 to about 60 weight percent.

UNITED STATES PATENT OFFICE
CERTIFICATE OF CORRECTION

Patent No. 3615561      Dated October 26, 1971

Inventor(s) Thomas J. Dolce and Donald L. McCabe

It is certified that error appears in the above-identified patent and that said Letters Patent are hereby corrected as shown below:

In the Specification at Column 2, line 41 "about 5 to 2 percent" should read -- about 5 to 20 percent --

Signed and sealed this 28th day of March 1972.

(SEAL)
Attest:

EDWARD M. FLETCHER, JR.
Attesting Officer

ROBERT GOTTSCHALK
Commissioner of Patents